United States Patent

Baker

[11] Patent Number: 5,109,881
[45] Date of Patent: May 5, 1992

[54] TEMPERATURE SENSITIVE CONTROL VALVE

[75] Inventor: Gerald S. Baker, Houston, Tex.

[73] Assignee: Cooper Industries, Inc., Houston, Tex.

[21] Appl. No.: 571,741

[22] Filed: Aug. 23, 1990

[51] Int. Cl.[5] .............................................. F16K 17/38
[52] U.S. Cl. ......................................... 137/72; 137/80
[58] Field of Search .................................. 137/72, 80

[56] References Cited

U.S. PATENT DOCUMENTS 4,884,595 12/1989 Grove ................................ 137/72 X Primary Examiner—John C. Fox

[57] ABSTRACT

A temperature sensitive valve having a body with an internal valve chamber being open through said body, an inlet extending into the valve chamber, a control outlet communicating with said valve chamber, and a bleed outlet communicating with said valve chamber, a bonnet having a bore secured to said body in surrounding relationship to the opening of the valve chamber through the body, a control sleeve positioned in said valve chamber and in said bonnet bore, means for sealing between the control sleeve and the interior of the valve chamber above and below the entry of said inlet into the valve chamber, said control sleeve defining a first valve seat in its lower portion. a second valve seat surrounding the entrance of the bleed outlet into said valve chamber, a valve member extending through said valve sleeve and having valve seat engaging surfaces for engaging said first and second valve seats, a first temperature sensitive material supporting said valve member in position out of engagement with said first valve seat, a second temperature sensitive material supporting said control sleeve in a first position and allowing it to move to a second position when exposed to temperature above a preselected temperature, said first temperature sensitive material upon reaching a elevated temperature which is less than said preselected temperature to release support of the valve member so that it moves out of engagement from said second valve seat and into engagement with said first valve seat to close flow between said inlet and said control outlet and open flow between said control outlet and said bleed outlet, said second temperature sensitive material releasing support of the control sleeve so that it moves to bring said valve member into engagement with said first valve seat when it reaches said preselected temperature and means biasing said valve member and said control sleeve so that excess pressure in said control outlet will move said control sleeve to open said second valve seat and allow such pressure to be bled from the valve chamber.

6 Claims, 4 Drawing Sheets

TEMPERATURE SENSITIVE CONTROL VALVE

FIELD OF THE INVENTION

The present invention relates to an improved temperature sensitive control valve for use in controlling the pressure holding a subsurface safety valve open in an oil and gas well until some excessive heat appears at which time the control valve responds to the heat to change the operation of the subsurface safety valve.

BACKGROUND

Prior to the present invention there have been many types of temperature sensitive valves which include a fusible element so that when an excess temperature from a fire or other source is experienced by the valve, the fusible element melts and releases its support for the element of the valve, either the stem or other element, so that it can move to a fail safe position.

In U.S. Pat. No. 4,214,600 the valve stem is held in spaced relationship to the seat surrounding the bore through the bonnet so that when a fire occurs, the stem will move toward the seat and the shoulder on the stem will backseat to prevent leakage of fluids in the valve chamber out through the stem seals which are normally damaged during a fire.

U.S. Pat. No. 3,843,853 discloses another type of use for fusible material to hold a plunger in position on the top of a valve stem with a cap secured to the bonnet by a plurality of balls which are held in locked position by the plunger until the fusible material melts. At such time the plunger is allowed to be lifted a distance to cause an external groove to register with the balls and when the balls move inwardly into the external groove the cap and plunger are released and the valve stem is free to move to its fail safe position.

U.S. Pat. No. 4,271,857 discloses another type of valve wherein the fusible material provides the support to prevent the backseating of the stem during normal operations and also when it melts provides a bleeding of pressure from the actuator so that movement of the stem is not prevented by pressure locked in the actuator.

U.S. Pat. Nos. 4,421,134, 4,505,291 and 3,838,705 are all examples of different types of structures which include the use of a fusible material to allow some movement of the valve stem when it is exposed to a fire.

U.S. Pat. Nos. 3,651,823 and 3,744,506 are related patents and disclose a fail safe device for closing in an oil and gas well that has ignited. The device is connected to control the blowout preventer and includes two normally closed check valves which are spaced apart by an epoxy resin which prevents movement of pistons which hold the check valves apart but when the epoxy melts the check valves move together and unseat each other to provide a flow path through the device from the source of operating pressure fluid to the blowout preventer.

SUMMARY

The present invention relates to a control valve which is sensitive to elevated temperatures and which controls flow between three ports, an inlet from the supply source, an outlet control line and a bleed outlet. In one position, temperature normal, the valve member closes only the communication through the bleed outlet; in a second position, temperature above a first reaction temperature and below a second reaction temperature, the valve closes communication between the inlet and the control line and opens communication between the control line and the bleed outlet; and in a third position, temperature above the second reaction temperature, the valve member closes all three ports but with a capacity to open the bleed port for venting of excess pressure accumulating in the control line.

An object of the present invention is to provide an improved temperature sensitive valve which will provide improved control for a subsurface safety valve.

Another object is to provide an improved temperature sensitive valve which not only provides a closing of the flow of control pressure from the inlet but allows venting of pressure from the control line when subjected to a temperature rise indicative of a fire and also provides a closing of all communication therethrough when exposed to a high temperature without preventing the bleeding of pressure from the control line but ensuring operation of the valve to its fire safe position.

BRIEF DESCRIPTION OF THE DRAWINGS

These and other objects and advantages of the present invention are hereinafter set forth and explained with respect to the drawings wherein.

DESCRIPTION OF THE PREFERRED EMBODIMENT

Figure 1:
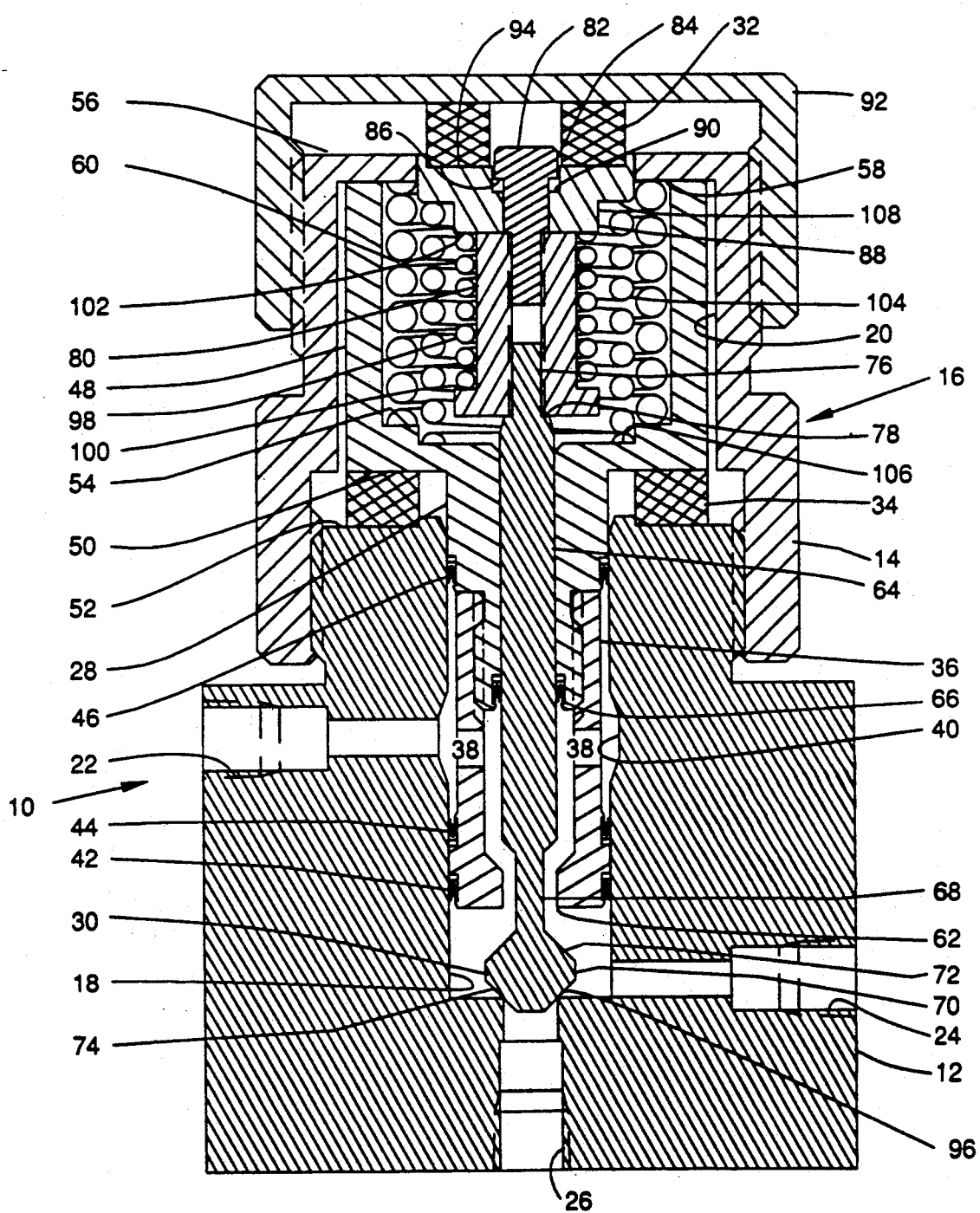
FIG. 1 is a sectional view of the improved temperature sensitive valve of the present invention in its normal operating position.

Valve 10 shown in the drawings is the improved valve of the present invention and is used to control the fluid pressure delivered to a subsurface safety valve which is to control the flow through the production tubing string so that flow will stop if there is a fire at the wellhead. This prevents the production of additional fluids which could feed the fire. Valve 10 includes body 12, bonnet 14 secured to body 12 as shown and control assembly 16 positioned within body 12 and bonnet 14.

Body 12 includes central valve chamber 18 which extends outwardly through body 12 at the point of connection of bonnet 14 to body 12 so that it is within bonnet bore 20. Inlet 22 extends through body 12 into communication with central valve chamber 18 and is connected to a suitable source of fluid under pressure which is to be used to control the subsurface safety valve (not shown). Control outlet 24 extends through body 12 and provides communication between the lower portion of central valve chamber 18 and the subsurface safety valve or other device which is to be controlled. Bleed outlet 26 extends through body 12 and provides communication from the lower portion of valve chamber 18 and a bleed line (not shown) through which control fluid is discharged from central valve chamber 18.

Control assembly 16 includes control sleeve 28, valve member 30, first temperature sensitive ring 32, second temperature sensitive ring 34 and other elements discussed hereinafter. Control sleeve 28 includes a lower portion 36 which is positioned within valve chamber 18 with ports 38 through lower portion 36 at a position communicating with internal groove 40 in valve chamber 18 into which inlet 22 communicates. Suitable sealing means are provided for sealing between the exterior of lower portion 36 of control sleeve 28 and the interior of valve chamber 18, such as seal rings 42, 44 and 46. The lower end of lower portion 36 forms a valve seat 62 which surrounds communication between the interior of lower portion 36 and the valve chamber 18 below control sleeve 28; and such portion of valve chamber 18 is in communication with outlets 24 and 26. The upper portion 48 of sleeve 28 has a substantially larger inner and outer diameters than lower portion 36. Shoulder 50 is formed on the lower surface of upper portion 48 and is held in spaced relationship above upper surface 52 on body 12 within bonnet 14 by second temperature sensitive ring 34. Inner upwardly facing shoulder 54 is formed on the interior of upper portion 48. Bonnet 14 is threaded onto the exterior of body 12, surrounds upper portion 48 of sleeve 28, and has an upper inwardly extending flange 56 which forms downwardly facing shoulder 58 so that spring 60 is positioned within upper portion 48 of sleeve 28 between shoulder 58 and shoulder 54. The lower end of lower portion 36 below ports 38 is reduced in diameter to form valve seat 62. Valve member 30 includes stem 64 which extends through the interior of lower portion 36 of sleeve 28 and seal ring 66 is provided for sealing therebetween. Reduced portion 68 of stem 64 extends through valve seat 62 and terminates in enlarged portion 70 of valve member 30 which forms upper seat engaging surface 72 and lower seat engaging surface 74. Stem 64 includes upper threaded portion 76 with upwardly facing shoulder 78 at the lower end of the threads so that when stem 64 is threaded into collar 80, shoulder 78 provided a stop therefor. Pin 82 is threaded into the upper end of collar 80 and includes head 84 with downwardly facing shoulder 86. Flange 88 surrounds pin 82 and in its normal position is spaced so that its inner upwardly facing shoulder 90 is below shoulder 86 of pin head 84 as shown in FIG. 1. Cap 92 is threaded to the upper exterior of bonnet 14 and supports first temperature sensitive ring 32 which also engages the upper surface 94 of flange 88 to retain valve member 30 in the position shown in FIG. 1, i.e. spaced from valve seat 62 and in engagement with valve seat 96 which surrounds the inner opening of bleed outlet 26 into valve chamber 18. Inner spring 98 is positioned between the upper outer surface 100 on collar 80 and inner downwardly facing shoulder 102 on flange 88. Intermediate spring 104 is positioned between upper surface 106 on the interior of upper portion 48 of control sleeve 28 and outer downwardly facing shoulder 108 on flange 88. Springs 98 and 104 both urge flange 88 upwardly with respect to control sleeve 28 and valve member 30 and it is retained in position by first temperature sensitive ring 32.

With control assembly 16 positioned as shown in FIG. 1, the pressure fluid delivered through inlet 22 is conducted through ports 38, valve seat 62 and control outlet 24 to the valve or other element to be controlled, such as a subsurface safety valve. Also, lower seat engaging surface 74 of valve member 30 is in sealing engagement with valve seat 96 to prevent the bleeding of pressure from within valve chamber 18 and from control outlet 24. In this manner the fluid pressure is maintained at all times until valve 10 experiences excessively high temperature, such as those encountered in a fire, when first temperature sensitive ring 32 melts. First ring 32 is preselected to have a temperature at which it melts or otherwise removes support for valve member 30. Second ring 34 is preselected to have a higher temperature than first ring 32 at which it melts or removes support for control sleeve 28. For example, it is contemplated that first ring 32 could be a fusible material having a melting temperature of 350° F. while second ring 34 could be a fusible material having a melting temperature of 450° F.

Figure 2:
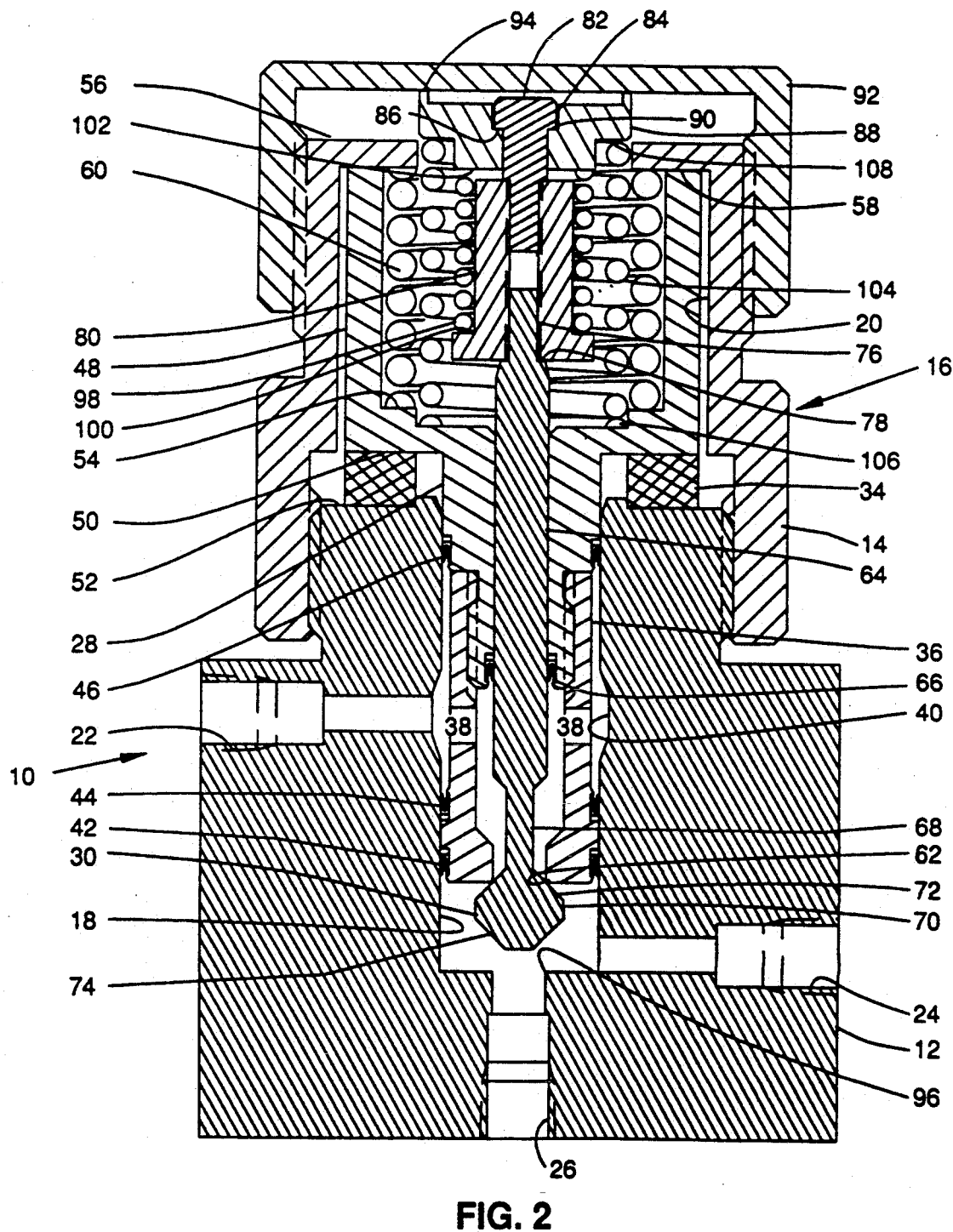
FIG. 2 is a sectional view of the improved valve of the present invention in its first fire safe position responsive to a first temperature level above normal operating temperatures.

With the melting of first ring 32 valve member 30 moves to the position should in FIG. 2 with upper seat engaging surface 72 of valve member 30 being in engagement with valve seat 62 to close off all communication from inlet 22 and also lower seat engaging surface 74 moves out of engagement with valve seat 96 so that any fluid under pressure within control port 24 and its connections and in the lower portion of valve chamber 18 are conducted through bleed outlet 26 to thereby reduce pressure in the control lines and allow the subsurface safety valve to close when it is the valve which is connected to control outlet 24.

Figure 3:
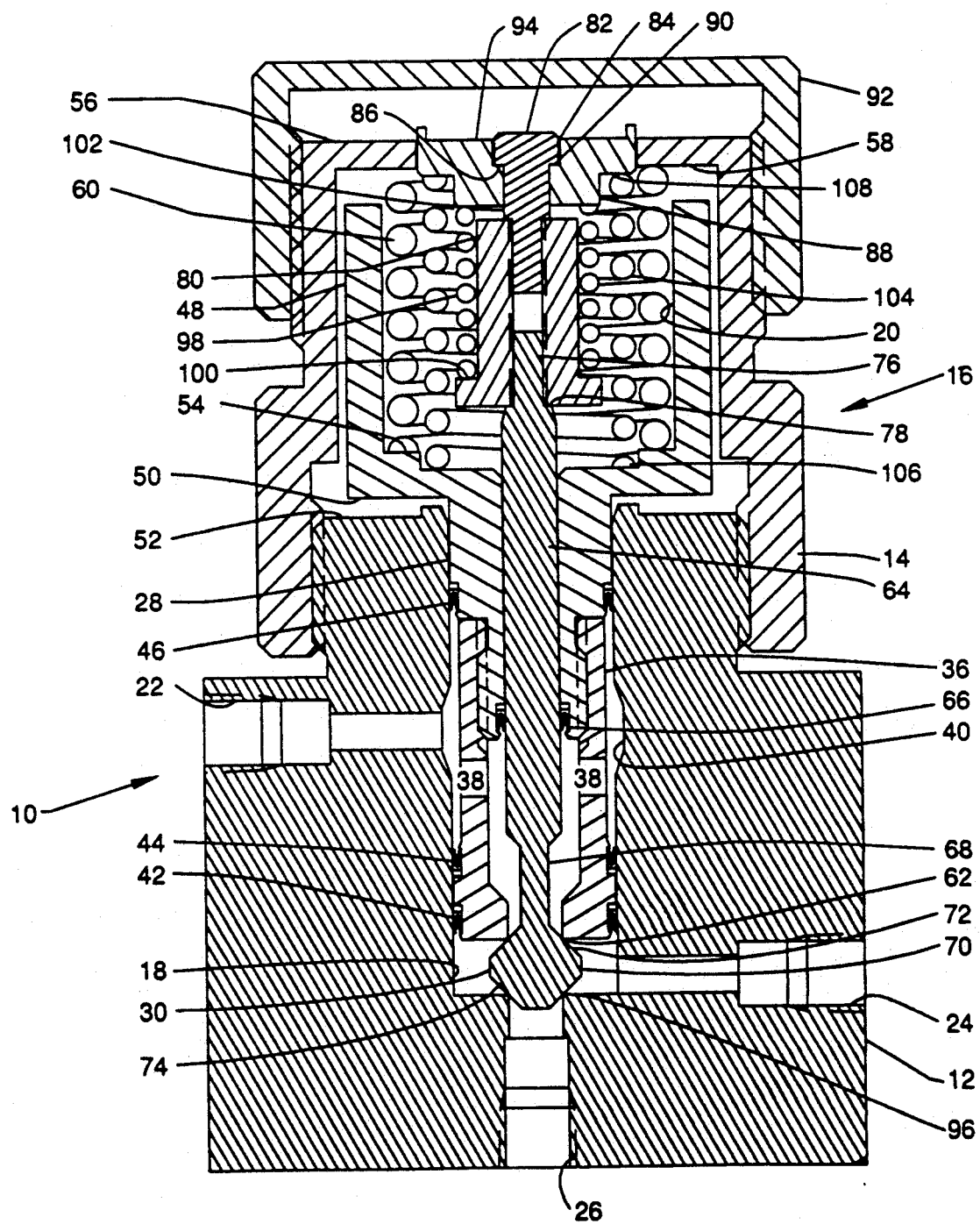
FIG. 3 is a similar sectional view of the improved valve in its second fire safe position responsive to a second temperature level above the first temperature level.

When the melting temperature of second ring 34 is exceeded, then control assembly 16 is moved to the position shown in FIG. 3 with both valve seats 96 and 62 being closed. In this position, however, control sleeve 28 can be moved upwardly responsive to pressure in the lower portion of valve chamber 18 which is sufficient to overcome the force of spring 60. This pressure is then bled from chamber 18 by the lifting of valve member 30 above valve seat 96. This ensures that the amount of pressure necessary to retain the subsurface safety valve open can not be held in the lower portion of chamber 18 because spring 60 is preselected to exert a force less than that which would be caused by the pressure needed to retain the subsurface safety valve open.

Figure 4:
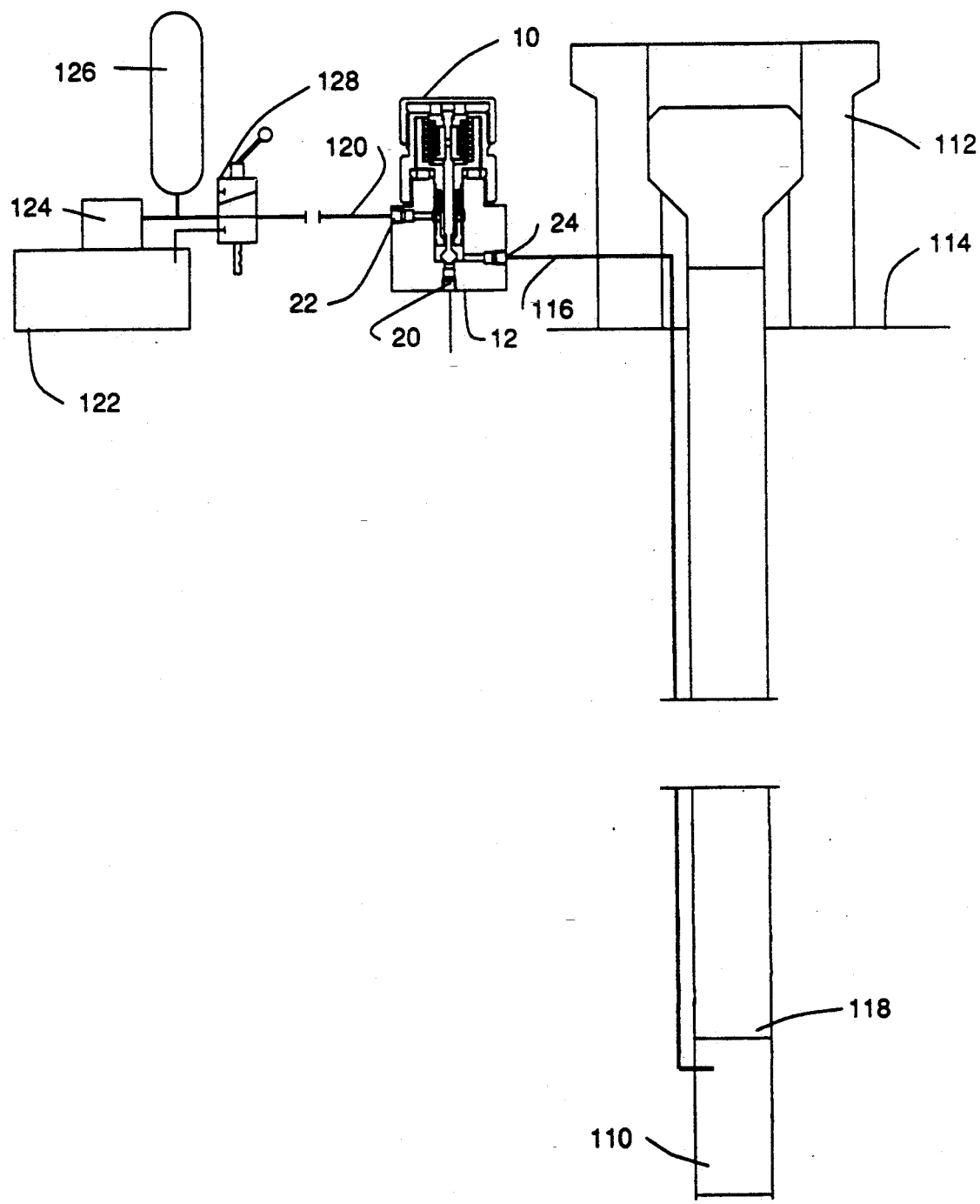
FIG. 4 is an elevation view of the improved valve of the present invention mounted on a wellhead.

The environment for the utilization of the improved valve 10 of the present invention is shown schematically in FIG. 4. Since valve 10 when it is used to provide the control of the operation of subsurface safety valve 110, it is normally positioned in close proximity to the production wellhead 112 at the surface 114 so that in the event of a fire which threatens the surface equipment it will be activated and bleed the pressure holding the safety valve 110 open so that the fluids normally produced therethrough do not flow to the wellhead. With the flow of production fluids shut off it prevents them from feeding the fire and causing worse damage. Valve 10 is positioned close to wellhead 112 and its control outlet 24 is connected through line 116 to subsurface safety valve 110 which is positioned within the production flowline 118 below wellhead 112. Line 120 connects into inlet 22 from the source of pressure P which includes reservoir 122, pump 124, accumulator 126 and control valve 128. With the equipment connected as shown, valve 10 provides the temperature sensitive control for the subsurface safety valve 110 so that it will shut off the production flow whenever there is a fire.

What is claimed is:
1. A temperature sensitive valve comprising
a body having a central valve chamber, an inlet into said chamber, a control outlet from said chamber and a bleed outlet from said chamber,
a valve member positioned in said valve chamber, a first valve seat surrounding communication between said inlet and said control outlet, a second valve seat surrounding communication of said bleed outlet and said control outlet, said valve member being positioned for movement to engage said valve seats, a first temperature sensitive means for retaining said valve member in engagement with said second valve seat, means biasing said valve member toward engagement of said first valve seat, a second temperature sensitive means for retaining said valve member out of engagement with said second valve seat after said first temperature sensitive means has released its retention of said valve member responsive to a first temperature, and means biasing said valve member toward said second valve seat, said second temperature sensitive means releasing its retention of said valve member responsive to a second temperature higher than said first temperature to allow said valve member to engage both said first and said second valve seats.

2. A valve according to claim 1 including a control sleeve having a tubular portion positioned within said valve chamber and sealing means for sealing against the surface of said valve chamber around said tubular portion above and below said inlet and defining said valve seat surrounding the lower opening in said tubular portion into the valve chamber, said bleed outlet and said control outlet opening into the lower portion of the valve chamber below said first valve seat, said valve member being positioned within said tubular portion and having a lower enlarged valve seat engaging means for engaging said first and second valve seats.

3. A valve according to claim 2 wherein said control sleeve is held in an upper position by said second temperature sensitive material so that said lower enlarged valve seat engaging means is not in engagement with said first valve seat while it is in engagement with said second valve seat.

4. A temperature sensitive valve comprising a body having a central valve chamber and three passages through the body into said valve chamber, a first valve seat surrounding communication between the opening of the first of said passages into the valve chamber and the opening of the other two passages, a second valve seat surrounding the opening of a second passage, a valve member positioned in said chamber, means for operating said valve member for movement in said chamber between said valve seats, a first temperature sensitive material supporting a portion of said valve member operating means to support the valve member in spaced relation to said first valve seat and in engagement with said second valve seat and upon reaching a preselected release temperature and responsive to temperature release allowing movement of said valve member into engagement with the first of said valve seats and out of engagement with said second valve seat, a second temperature sensitive material supporting a portion of said valve member operating means to support the valve member in spaced relation to said second valve seat after release by said first valve member and having a preselected release temperature higher than the release temperature of said first temperature sensitive material and responsive to temperature release allowing said valve member to engage both of said valve seats, and means biasing said valve member being biased so that when released by both of said temperature sensitive materials to engage both of said valve seats with the biasing toward said second seat being sufficiently light to cause said valve member to lift off said second seat when excessive pressure above a preselected minimum is present in said valve chamber with said valve member in engagement with both of said valve seats.

5. A valve for controlling the pressure maintained to the operator of a subsurface safety valve comprising a body having a valve chamber, a supply passage, a control passage and a bleed passage communicating with the valve chamber, valve means controlling flow from the supply passage to the control passage and from said control passage to said bleed passage, a first temperature sensitive means for supporting said valve means in a position with flow between said supply and control passages are open and flow between said control and bleed passages are closed and when reaching its preselected release temperature the valve means moves to close flow between the supply and control passages and to open flow between said control and bleed passages, a second temperature sensitive means for supporting said valve means in a position with the flow between said control and bleed passages is open following the release of said first temperature sensitive means and having a release temperature higher than the release temperature of said first temperature sensitive means to allow the valve means to move to a position closing flow between all three passages.

6. A valve according to claim 5 including means biasing said valve means toward closed position between said control and bleed passages following release by said second temperature sensitive means but allowing movement of said valve means away from its position closing flow between said control and bleed passages responsive to pressure from said control passage exceeding a preselected limit.

* * * * *